(12) United States Patent
OlmstedThompson et al.

(10) Patent No.: US 9,678,820 B2
(45) Date of Patent: Jun. 13, 2017

(54) ALERTING WITH DUPLICATE SUPPRESSION

(71) Applicant: VMware, Inc., Palo Alto, CA (US)

(72) Inventors: Jeremy OlmstedThompson, New York, NY (US); Darren Brown, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/753,727

(22) Filed: Jun. 29, 2015

(65) Prior Publication Data

US 2016/0379480 A1  Dec. 29, 2016

(51) Int. Cl.
| | |
|---|---|
| G06F 9/455 | (2006.01) |
| G06F 9/46 | (2006.01) |
| G06F 15/173 | (2006.01) |
| G06F 11/00 | (2006.01) |
| G06F 3/00 | (2006.01) |
| G06F 9/44 | (2006.01) |
| G06F 13/00 | (2006.01) |
| G06F 11/07 | (2006.01) |
| G08B 29/18 | (2006.01) |
| G06F 9/54 | (2006.01) |

(52) U.S. Cl.
CPC ...... *G06F 11/0766* (2013.01); *G06F 9/45558* (2013.01); *G06F 9/54* (2013.01); *G06F 9/542* (2013.01); *G06F 9/546* (2013.01); *G06F 11/00* (2013.01); *G06F 11/07* (2013.01); *G06F 11/0784* (2013.01); *G06F 11/0787* (2013.01); *G06F 11/0793* (2013.01); *G08B 29/18* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,408,458 | B1 * | 8/2008 | Sheleheda | G08B 25/001 340/506 |
| 7,818,631 | B1 * | 10/2010 | Halikhedkar | H04Q 3/0075 714/48 |
| 8,041,799 | B1 | 10/2011 | Usery et al. | |
| 2006/0156398 | A1 * | 7/2006 | Ross | G06F 21/554 726/22 |
| 2007/0061403 | A1 * | 3/2007 | Seaburg | H04L 12/5855 709/206 |
| 2009/0070640 | A1 * | 3/2009 | Stabile | H04L 43/04 714/57 |

(Continued)

*Primary Examiner* — Charles Swift

(57) ABSTRACT

The present disclosure is related to systems, methods, and non-transitory machine readable media for alerting with duplicate suppression. An example non-transitory machine readable medium can store instructions executable by a processing resource to cause a computing system to receive an alert at a first virtual computing instance (VCI) from a second VCI, compare the alert with at least one previously received alert to determine if the alert is a duplicate alert, and send the alert to an alert notification queue associated with the first VCI in response to a determination that the alert is not a duplicate alert. In some embodiments, the medium can store instructions to confirm that the alert has been sent in response to the determination that the alert is a duplicate alert.

17 Claims, 4 Drawing Sheets

(56) References Cited

U.S. PATENT DOCUMENTS

| | | | | |
|---|---|---|---|---|
| 2009/0132330 A1* | 5/2009 | Shaw | ............... | G06F 9/542 |
| | | | | 705/7.29 |
| 2009/0222815 A1* | 9/2009 | Dake | ............... | G06F 9/455 |
| | | | | 718/1 |
| 2010/0088384 A1* | 4/2010 | Wilkinson | ............ | G06Q 40/04 |
| | | | | 709/206 |
| 2011/0055076 A1* | 3/2011 | Trifiletti | ............ | G06Q 20/04 |
| | | | | 705/39 |
| 2011/0289144 A1* | 11/2011 | Underwood | ...... | H04L 12/1895 |
| | | | | 709/204 |
| 2012/0254671 A1* | 10/2012 | Francisco | ......... | G06F 11/0709 |
| | | | | 714/48 |
| 2012/0259962 A1* | 10/2012 | Bose | ............ | H04L 41/50 |
| | | | | 709/223 |
| 2014/0195670 A1* | 7/2014 | Jain | ............. | H04L 41/069 |
| | | | | 709/224 |
| 2014/0310564 A1* | 10/2014 | Mallige | ............. | G06F 11/0781 |
| | | | | 714/47.1 |
| 2016/0088099 A1* | 3/2016 | Crudele | ............ | H04L 51/20 |
| | | | | 709/204 |
| 2016/0119181 A1* | 4/2016 | Suzuki | ............. | H04L 43/0817 |
| | | | | 709/223 |

* cited by examiner

ALERTING WITH DUPLICATE SUPPRESSION

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
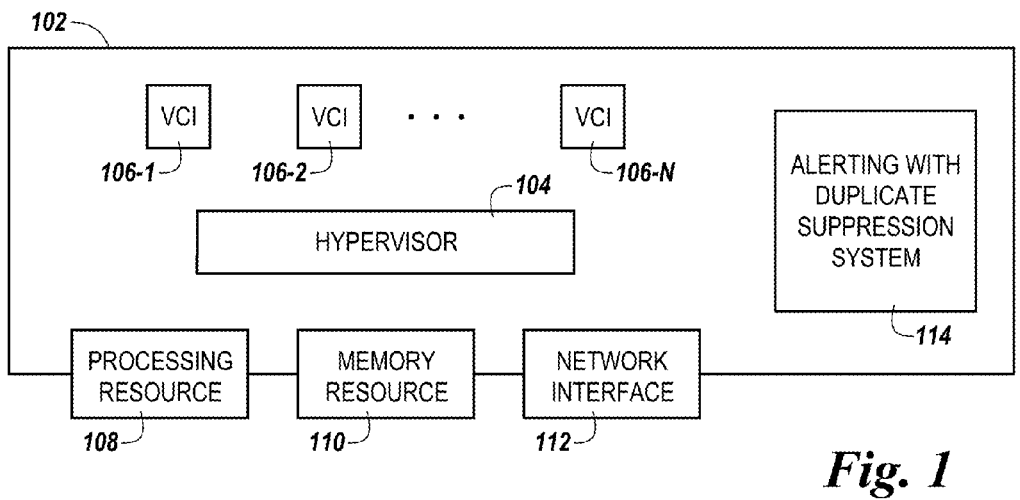
FIG. 1 is a diagram of a host for alerting with duplicate suppression according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a distributed computing system, for example. In such a system, alerts can be propagated either from a user to at least one of the VCIs in the system, or between VCIs in the system. Alerts can be generated in response to various connectivity issues and/or integration issues among components of a distributed computing system; however, currently employed alerting techniques can suffer from a number of shortcomings.

For example, some currently employed alerting mechanisms provide alerts that are not configurable, alert notifications that can depend on one another (e.g., a failure of one notification can affect a different notification), alerts that administrators can have little or no control over (e.g., in the case of user created alerts), and/or can lack scale out support (e.g., if a network goes down, a user can receive alerts from every VCI in the system). These shortcomings can lead to situations where alerts are either not sent or received, or situations where duplicate alerts are sent and received.

As VCIs become increasingly popular and widespread, it can become beneficial to limit an amount of duplicate alert notifications raised and/or sent across a distributed computing system that includes VCIs. This is relevant to both service providers and customers, for example, for customers who consume virtual computing services and service providers who provide virtual computing services and/or distributed computing systems. Advantageously, embodiments described herein can allow for distributed system alerting with duplicate suppression. For example, embodiments described herein can provide configurable alerts, independent alerts (e.g., alerts that do not depend on each other), scale out support, administrator controllable alerts, and/or suppression of duplicate alerts, among other benefits.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1A, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to alerting with duplicate suppression, for example, in the context of a distributed system including one or more VCIs. As used herein, an "alert" is a notification that is implemented via one or more notification mechanisms. For example, an alert can be created in response to memory usage exceeding a particular threshold value for a given period of time. As used herein, a "notification mechanism" is the method and/or inputs of a specific notification. For example, a notification mechanism can include an electronic mail, a text message, operations manager, etc.

Alerts and/or notification mechanisms can be configurable, for example by a user or administrator. For example, a user can configure what types of alerts they would like to see and/or what notification mechanisms can be used to present the alerts. In some embodiments, a user can configure the system such that multiple notification mechanisms can be used for a given alert. As an example, a user can request that a notification regarding an alert is sent via email and that the notification is sent via a system operations manager. In this example, the user should receive the alert both as an email and from the system operations manager. If, however, the email or the system operations manager fail to provide the alert, i.e., if one of the notification mechanisms fails, the alert should be sent via the notification mechanism that did not fail. In this regard, according to embodiments of the present disclosure, a failure of a notification mechanism may not cascade.

In some embodiments, VCIs in the distributed system can be slave VCIs or master VCIs. For example, a particular VCI can be a master VCI and the other VCIs can be slave VCIs. As used herein, a "master" is a VCI that is configured to control requesting, receiving, and/or processing alerts from slave devices. As an example, a master VCI can be configured to control alert suppression and/or alert de-duplication of alerts that are triggered at the slave VCIs.

As described in more detail herein, embodiments of the present disclosure can allow for alerting with duplicate suppression by sending alerts to a particular VCI, for example, a master VCI, and comparing the alerts received at the particular VCI with previous alerts received at the particular VCI. In some embodiments, alerts that are determined to be duplicate alerts can be deleted. As used herein, a "duplicate alert" is an alert that matches an alert that was previously sent within a configurable time period.

FIG. 1 is a diagram of a host for alerting with duplicate suppression according to the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can be a master VCI. For example, VCI 106-1 can be a master VCI, and VCIs 106-2, . . . , 106-N can be slave VCIs. The host 102 can be in communication with an alerting with duplicate suppression system 114.

In some embodiments, a system including the alerting with duplicate suppression system 114 can include a master VCI (e.g., VCI 106-1) configured to trigger an alert and a plurality of slave VCIs (e.g., VCIs 106-2, . . . , 106-N), where each slave VCI of the plurality of slave VCIs 106-2, . . . , 106-N can be configured to trigger alerts. In some embodiments, the master VCI 106-1 can be configured to process alerts detected at the respective plurality of slave VCIs 106-2, . . . , 106-N. In some embodiments, the alerting with duplicate suppression system can include a combination of software and hardware, or the alerting with duplicate suppression system 114 can include software and can be provisioned by processing resource 108. An example of the alerting with duplicate suppression system is illustrated and described in more detail with respect to FIG. 2.

Figure 2:
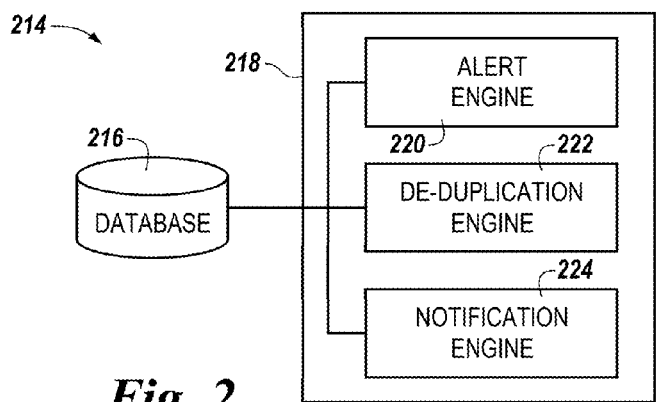
FIG. 2 is a diagram of a system for alerting with duplicate suppression according to the present disclosure.

FIG. 2 is a diagram of a system for alerting with duplicate suppression according to the present disclosure. The system 214 can include a database 216, a subsystem 218, and/or a number of engines, for example alert engine 220, de-duplication engine 222, and/or notification engine 224, and can be in communication with the database 216 via a communication link. The system 214 can include additional or fewer engines than illustrated to perform the various functions described herein. The system can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the alert engine 220 can include a combination of hardware and program instructions that can be configured to detect an alert at a respective VCI, record an indication at the respective slave VCI that the alert has been detected, and send the alert from the respective slave VCI to the master VCI.

The de-duplication engine 222 can be configured to compare the alert to at least one previous alert to determine whether the alert has been sent to a user device. As used herein, a "user device" is a device that a user can use to receive alerts. For example, a computer, laptop, smartphone, email client, pager, etc. In some embodiments, the de-duplication engine 222 can be configured to send the alert to a notification provider queue in response to a determination that the alert has not been sent to a user device. The de-duplication engine 222 can be further configured to re-queue the alert in the notification provider queue based on a determination that the notification provider queue failed to send the alert to the user device. In some embodiments, the de-duplication engine 222 can be configured to delete the alert in response to a determination that the alert has been sent to the user device. As described in more detail in connection with FIG. 4, the notification provider queue can be configured to poll the master VCI (e.g., VCI 106-1 illustrated in FIG. 1) to determine if a new alert has been received by the master VCI.

In some embodiments, the notification engine 224 can be configured to send the alert to the user device in response to a determination that the alert has not been sent to the user device, and send a confirmation to the respective slave VCI that the alert has been sent to the user device. In some embodiments, the notification engine 224 can be configured to send a notification to a respective slave VCI (e.g., VCIs 106-2, . . . , 106-N illustrated in FIG. 1) indicating that the alert was sent to the user device.

Figure 3:
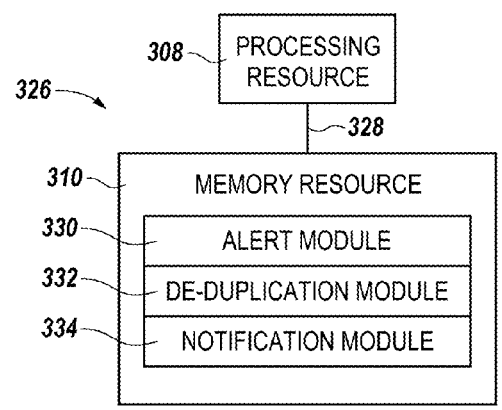
FIG. 3 is a diagram of a machine for alerting with duplicate suppression according to the present disclosure.

FIG. 3 is a diagram of a machine for alerting with duplicate suppression according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI. The program instructions (e.g., machine-readable instructions (MRI)) can include instructions stored on the MRM to implement a particular function (e.g., an action such as alerting with duplicate suppression). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 330, 332, 334 that when executed by the processing resources 308 can perform a number of functions. As used herein a module includes a set of instructions included to perform a particular task or action. The number of modules 330, 332, 334 can be sub-modules of other modules. For example, the de-duplication module 332 can be a sub-module of the alert module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by a processing resource 308, can function as a corresponding engine as described with respect to FIG. 2. For example, the alert module 330 can include program instructions and/or a combination of hardware and program instructions that, when executed by a processing resource 308, can function as the alert engine 220, the de-duplication module 332 can include program instructions and/or a combination of hardware and program instructions that, when executed by a processing resource 308, can function as the de-duplication engine 222, and/or the notification module 334 can include program instructions and/or a combination of hardware and program instructions that, when executed by a processing resource 308, can function as the notification engine 224. Further, the machine 326 can include an alert module 330, which can include instructions to detect an alert at a respective VCI, record an indication at the respective slave VCI that the alert has been detected, and send the alert from the respective slave VCI to the master VCI.

In some embodiments, the machine 326 can include a de-duplication module 332, which can include instructions to compare the alert to at least one previous alert to determine whether the alert has been sent to a user device. In some embodiments, the de-duplication module 322 can be configured to send the alert to a notification provider queue in response to a determination that the alert has not been sent to a user device. The de-duplication module 322 can be further configured to re-queue the alert in the notification provider queue based on a determination that the notification provider queue failed to send the alert to the user device.

The machine 326 can include a notification module 334, which can include instructions to send the alert to the user device in response to a determination that the alert has not been sent to the user device, and send a confirmation to the respective slave VCI that the alert has been sent to the user device. In some embodiments, the notification module 324 can be configured to send a notification to a respective slave VCI indicating that the alert was sent to the user device.

Figure 4:
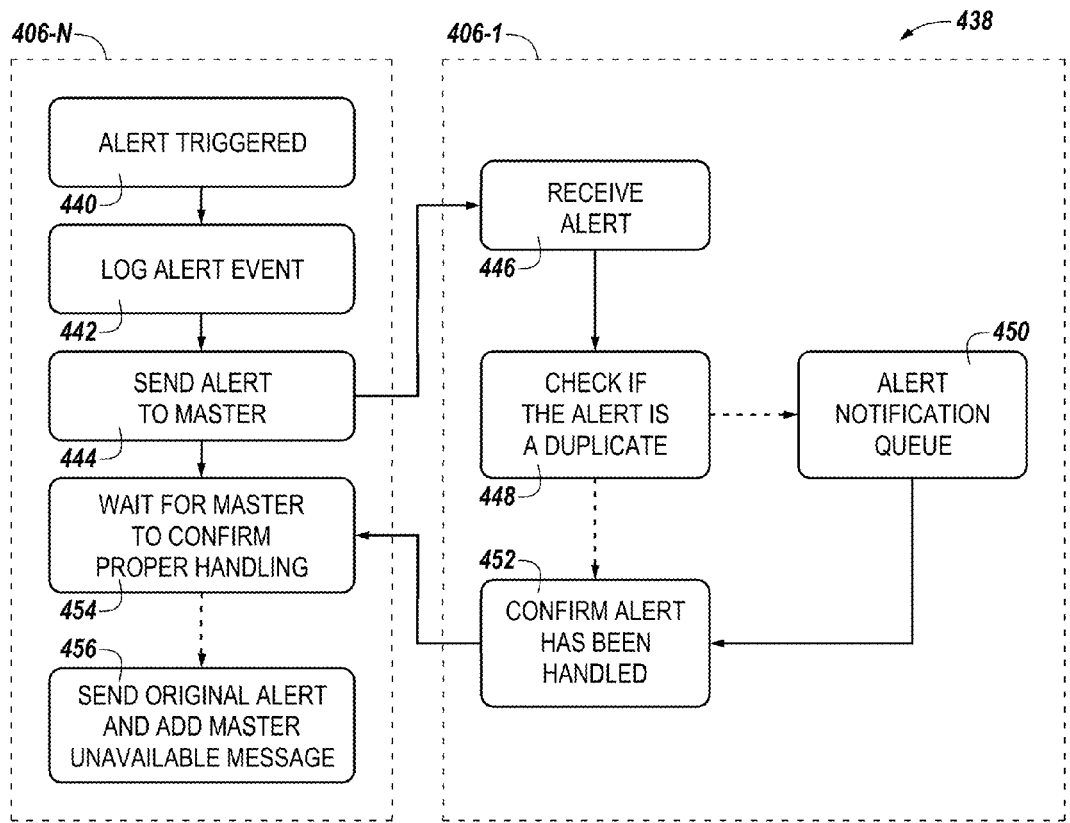
FIG. 4 is a flow chart illustrating a number of methods for alerting with duplicate suppression according to the present disclosure.

FIG. 4 is a flow chart 438 illustrating a number of methods for alerting with duplicate suppression according to the present disclosure. In some embodiments, a plurality of VCIs 406-1, . . . , 406-N can be provided. At least one of the VCIs 406 can be a master VCI (e.g., VCI 406-1), and at least one VCI can be a slave VCI (e.g., VCI 406-N). An alert can be triggered at a slave VCI 406-N, for example, at 440. In some embodiments, the alert can be logged at 442. For example, an indication that the alert was triggered can be logged (e.g., recorded, stored, etc.). Logging alerts can allow a user and/or administrator to view alerts that have been raised at a later time, for example to track what alerts have been sent, when such alerts have been sent, and/or whether any such alerts failed.

At 444, the alert can be sent to the master VCI 406-1, and, at 446, the alert can be received at the master VCI 406-1. Once the alert has been received at the master VCI 406-1, a determination whether the alert is a duplicate alert can be made, for example at 448. For example, at 448, the alert can be checked against at least one previously received alert to determine if the alert is a duplicate alert. In some embodiments, the alert can be checked against previously logged and/or stored alerts that have been processed within a threshold period of time to determine if the alert is a duplicate alert. Advantageously, checking the alert against previously logged and/or stored alerts can facilitate de-duplication of the alert.

In some embodiments, the slave VCI 406-N can de-duplicate an alert before sending the alert to the master VCI 406-1. That is, prior to step 444, the slave VCI 406-N can de-duplicate an alert, for example by checking the alert against recently sent alerts to see if the alert is the same as a recently sent alert. Advantageously, de-duplicating the alert prior to sending the alert to the master VCI 406-1 can reduce the number of alerts sent to the master VCI 406-1, thereby decreasing an amount of network traffic in the system. In some embodiments, de-duplicating an alert at the slave VCI 406-N can be beneficial for reducing the number of rapidly repeating alerts that are sent to the master VCI 406-1 for de-duplication.

In some embodiments, in response to a determination that the alert is not a duplicate alert, the alert can be sent to an alert notification queue, for example, at 450. As discussed in more detail in connection with FIG. 5, the alert notification queue 450 can be configured to monitor pending alerts and send them one at a time. In some embodiments, the alert notification queue 450 can be configured to send an alert to a user device, however, embodiments are not so limited, and the alert notification queue can be configured to send the alert to a VCI among the plurality of VCIs. Once the alert has been sent, the master VCI 406-1 can confirm that the alert has been handled, for example, at 452.

In some embodiments, in response to a determination that the alert is a duplicate alert, it can be confirmed whether the alert has been handled at 452. For example, the master VCI 406-1 can send a notification to the slave VCI 406-N confirming the alert has been handled. In some embodiments, the master VCI 406-1 can determine which notification providers are registered for the alert and can queue each alert to be sent to the user device. In some embodiments, the notification provider can be a java class including logic and can be configured to write information regarding an alert to a log file, for example.

At 454, the slave VCI 406-N can wait for the master VCI 406-1 to confirm that the alert has been handled. In some examples, the master VCI 406-1 can send an indication (e.g., a notification, message, etc.) to the slave VCI 406-N after the notification providers have been registered to send the alert confirming that the alert has been handled.

In some embodiments, at 456, the slave VCI 406-N can send the original alert in response to a threshold timeout period associated with receiving an indication that the alert has been handled being exceeded. For example, a threshold timeout period regarding how long the slave VCI 406-N should wait before handling the alert can be exceed, and the slave VCI 406-N can send the alert. A threshold timeout period can include a particular amount of time or period of time (e.g., 5 seconds, 10 minutes, etc.). In some embodiments, the threshold timeout period can be configurable and/or selectable by a user, for example. In some embodiments, the slave VCI 406-N can add a message to the alert indicating that the master VCI 406-1 was unavailable and/or that the master VCI 406-N did not send an indication that the alert had been handled within the threshold timeout period. In some embodiments, an alert can still be sent even if de-duplication of the alert fails, thus providing a user with the alert even if the alert is a duplicate alert. In this regard, sending an alert even if it is a duplicate alert can be favored over not sending an alert at all. In some embodiments, an alert can have a minimum repeat interval associated therewith. For example, an alert can only be raised a particular number of times during a particular time interval. In some embodiments, if a particular alert is raised after the same particular alert has been raised in excess of the particular number of times the particular alert can be raised during the particular time interval, a notification indicating that the alert can't be processed can be provided. As an example, an alert indicating that the disk is full due to the particular number of times a particular alert can be raised in a given time period being exceeded can be provided. In some embodiments, such an alert can include an indication of the number of times the particular alert has been squelched in the particular time period.

Figure 5:
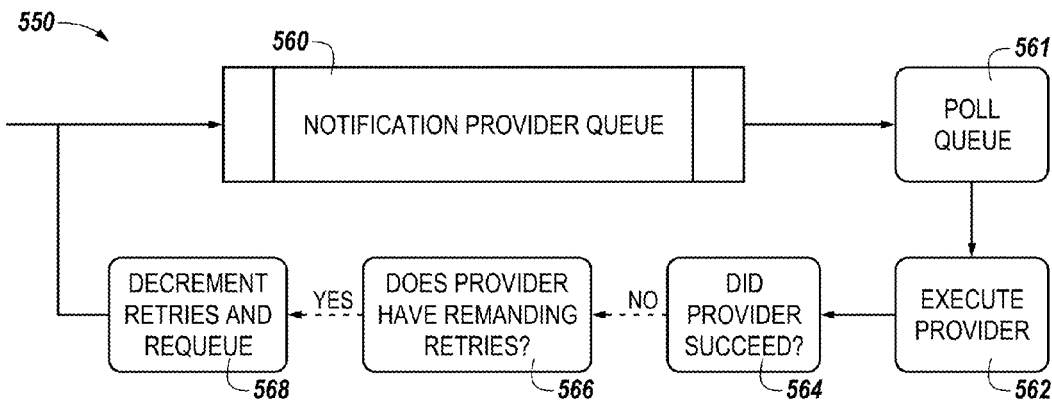
FIG. 5 is a flow chart illustrating an alert notification queue for alerting with duplicate suppression according to the present disclosure.

FIG. 5 is a flow chart illustrating an alert notification queue 550 for alerting with duplicate suppression according to embodiments of the present disclosure. In some embodiments, the alert notification queue 550 can include a combination of components configured to facilitate suppression of duplicate alerts. The alert notification queue can be a persistent, on-disk queue. In some embodiments, the alert notification queue 550 can include a notification provider queue 560. The notification provider queue 560 can be configured as a pipeline such that alerts enter the notification provider queue 560 in a particular order, and exit the notification provider queue 560 in the same particular order. In some embodiments, an alert exiting the notification provider queue 560 can be sent to a poll queue 561. The poll queue 561 can be configured to receive alerts from the notification provider queue 560 and can be configured to determine if new alerts have been received by the notification provider queue 560.

In some embodiments, the alert notification queue 550 can include an execute provider 562. The execute provider 562 can be configured to attempt to send the alert. In some embodiments, the execute provider 562 can be configured to send the alert to a user device, for example. In some embodiments, the execute provider 562 can be configured to re-try sending the alert a particular number of times, e.g., the execute provider 562 can be configured to attempt to send the alert more than once up to a particular number of times. In some embodiments, the number of times sending the alert can be retried can be configurable and/or selectable, for example, by a user. At 564, a determination whether the execute provider 562 successfully sent the alert. If the execute provider 562 did not successfully send the alert, a determination can be made at 566 whether the execute provider 562 has remaining tries available to attempt to re-send the alert. In some embodiments, at 568, the number of remaining tries to send the alert can be decremented and the alert can be re-queued in the notification provider queue 560 to be sent again.

Figure 6:
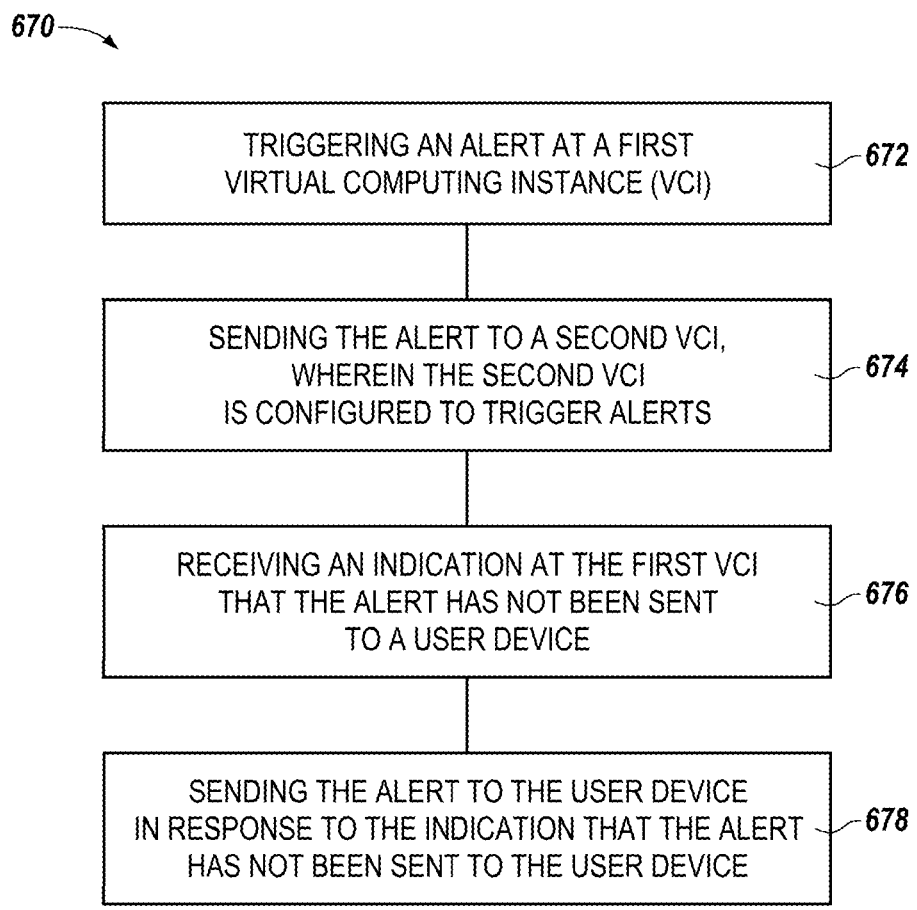
FIG. 6 is a flow chart illustrating a number of methods for alerting with duplicate suppression according to the present disclosure.

FIG. 6 is a flow chart 670 illustrating a number of methods for distributed system alerting with duplicate suppression according to the present disclosure. At 672, the method can include triggering an alert at a first VCI. In some embodiments, the first VCI can be configured to be a slave VCI. At 674, the method can include sending the alert to a second VCI, wherein the second VCI is configured to trigger alerts. In some embodiments, the second VCI can be a master VCI.

At 676, the method can include receiving an indication at the first VCI that the alert has not been sent to a user device. At 678, the method 670 can include sending the alert to the user device in response to the indication that the alert has not been sent to the user device. For example, the alert can be sent to the user device in response to a timeout period associated with sending the alert being exceeded and/or in response to a configurable number of retries to send the alert being exceeded.

In some embodiments, the first VCI can be configured to be a slave VCI, and the second VCI can be configured to be a master VCI. For example, the master VCI can be configured to process alerts from the slave VCI. A master VCI can be elected or the master VCI can be assigned.

In some embodiments, the method 670 can include sending the alert to a user device in response to threshold timeout period associated with receiving an indication that the alert has not been sent to a user device being exceeded. For example, the threshold timeout period can be a user-selectable time period (e.g., 5 seconds, 5 minutes, one hour, etc.) within which the alert must be processed and sent to the user device. If this timeout period is exceeded, the alert should be sent to the user device promptly by either the master VCI (e.g., 406-1 illustrated in FIG. 4), or by a slave VCI (e.g., VCI 406-N illustrated in FIG. 4).

The method 670 can include storing information regarding the alert at the first VCI in response to triggering the alert. For example, the type of alert and/or time the alert was triggered can be stored in response to triggering the alert. In this regard, triggered alerts can be stored for later access, for example, access by a user or administrator to view information regarding the alert. In some embodiments, multiple alerts can be analyzed to determine an average alert query time so that a determination if any alerts should be disabled can be made.

In some embodiments, the method 670 can include receiving a second alert that is triggered at a third VCI. For example, a second alert can be triggered at a third VCI, and can be received at the master VCI. In some embodiments, the method 670 can include sending the alert to a user device via at least one notification mechanism. In some embodiments, at least one notification mechanism can be selectable by a user. For example, the notification mechanism can include at least one of an electronic mail and an electronic log file.

Figure 7:
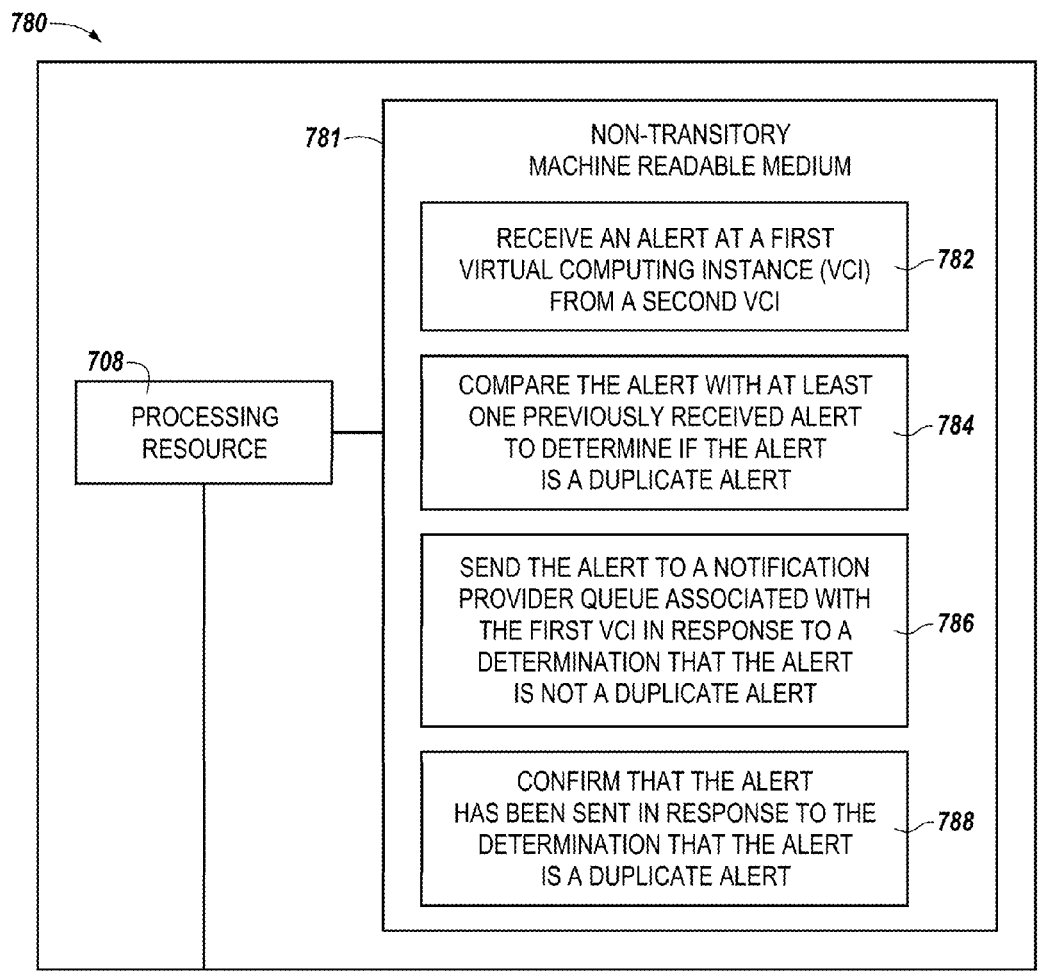
FIG. 7 is a diagram of a system including a processing resource and non-transitory computer readable medium for alerting with duplicate suppression according to the present disclosure.

FIG. 7 is a diagram of a system 780 including a processing resource 708 and non-transitory computer readable medium 781 for alerting with duplicate suppression according to the present disclosure. The processing resource 708 can be configured to execute instructions stored on the non-transitory computer readable medium 781. For example, the non-transitory computer readable medium 781 can be any type of volatile or non-volatile memory or storage, such as random access memory (RAM), flash memory, read-only memory (ROM), storage volumes, a hard disk, or a combination thereof. When executed, the instructions can cause the processing resource 708 to perform alerting with duplicate suppression.

The medium 781 can store instructions 782 executable by the processing resource 708 to receive an alert at a first virtual computing instance (VCI) from a second VCI. The medium 781 can further store instructions 784 executable by the processing resource 708 to compare the alert with at least one previously received alert to determine if the alert is a duplicate alert.

In some embodiments, the medium 781 can further store instructions 786 executable by the processing resource 708 to send the alert to a notification provider queue associated with the first VCI in response to a determination that the alert is not a duplicate alert.

In some embodiments, the medium 781 can further store instructions 788 executable by the processing resource 708 to confirm that the alert has been sent in response to the determination that the alert is a duplicate alert.

In some embodiments, the medium 781 can further store instructions executable by the processing resource 708 to cause the notification provider queue to poll the first VCI for incoming alerts. The medium 781 can further store instructions executable by the processing resource 708 to cause the notification provider queue to re-queue the alert in response to a determination that sending the alert failed.

In some embodiments, the medium 781 can further store instructions executable by the processing resource 708 cause the notification provider queue to re-queue the alert in response to a determination that sending the alert has failed less than a threshold number of retries. The medium 781 can further store instructions executable by the processing resource 708 to send a confirmation message to the second VCI in response to the determination that the alert is a duplicate alert.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory machine-readable medium storing instructions executable by a processing resource to reduce alerts in distributed computing system by causing the distributed computing system to:
   receive an alert at a first virtual computing instance (VCI) from a second VCI, wherein the first VCI and the second VCI are included in the distributed computing system;
   compare the alert with at least one previously received alert to determine if the alert is a duplicate alert;
   send the alert to an alert notification queue associated with the first VCI in response to a determination that the alert is not a duplicate alert;
   cause the alert notification queue to re-queue the alert in response to a determination that sending the alert failed;
   confirm that the alert has been sent in response to the determination that the alert is a duplicate alert;
   send the alert to the alert notification queue in response to a determination that de-duplication of the alert failed within a threshold timeout period; and
   send the alert to a user device via at least one of a plurality of notification mechanisms.

2. The non-transitory machine-readable medium of claim 1, wherein the instructions are executable by the processing resource to cause the alert notification queue to poll the first VCI for incoming alerts.

3. The non-transitory machine-readable medium of claim 1, wherein the instructions are executable by the processing resource to cause the alert notification queue to re-queue the alert in response to a determination that sending the alert has failed less than a threshold number of retries.

4. The non-transitory machine-readable medium of claim 1, wherein the instructions are executable by the processing resource to send a confirmation message to the second VCI in response to the determination that the alert is a duplicate alert.

5. A method of reducing alerts in distributed computing system, comprising:
   triggering an alert at a first virtual computing instance (VCI);
   sending the alert to a second VCI, wherein the second VCI is configured to trigger alerts;
   receiving an indication at the first VCI that the alert:
      has been de-duplicated at the second VCI; and
      has not been sent to a user device;
   sending the alert to the user device in response to the indication that the alert has not been sent to the user device; and
   sending the alert to the user device via at least one notification mechanism in response to a determination that de-duplication of the alert at the second VCI failed, wherein the first VCI and the second VCI are included in a distributed computing system.

6. The method of claim 5, comprising sending the alert to the user device in response to a threshold timeout period associated with receiving the indication that the alert has not been sent being exceeded.

7. The method of claim 5, wherein the first VCI is configured to be a slave VCI and the second VCI is configured to be a master VCI, wherein the master VCI is configured to process alerts from the slave VCI.

8. The method of claim 5, comprising storing information regarding the alert at the first VCI in response to triggering the alert.

9. The method claim of 5, comprising receiving a second alert, wherein the second alert is triggered at a third VCI.

10. The method of claim 5, wherein the at least one notification mechanism is selectable by a user.

11. The method of claim 5, wherein the at least one notification mechanism includes at least one of an electronic mail and an electronic log file.

12. A system to reduce alerts in distributed computing system, comprising:
   a master virtual computing instance (VCI) configured to trigger an alert; and
   a plurality of slave VCIs, each slave VCI of the plurality of slave VCIs configured to trigger alerts;
   an alert engine configured to:
      detect an alert at a respective slave VCI;
      record an indication at the respective slave VCI that the alert has been detected; and
      send the alert from the respective slave VCI to the master VCI;
   a de-duplication engine configured to compare the alert to at least one previous alert to determine whether the alert has been sent to a user device; and
   a notification engine configured to:
      send the alert to the user device via at least one notification mechanism in response to a determination that:
         de-duplication of the alert failed within a threshold timeout period; and
         the alert has not been sent to the user device within a configurable timeout period; and
      send a confirmation to the respective slave VCI that the alert has been sent to the user device, wherein the master VCI and the plurality of slave VCIs are included in the distributed computing system.

13. The system of claim 12, wherein the de-duplication engine is configured to send the alert to an alert notification queue in response to a determination that the alert has not been sent to a user device.

14. The system of claim 13, wherein the de-duplication engine is further configured to re-queue the alert in the alert notification queue based on a determination that the alert notification queue failed to send the alert to the user device.

15. The system of claim 13, wherein the alert notification queue is configured to poll the master VCI to determine if a new alert has been received by the master VCI.

16. The system of claim 12, wherein the de-duplication engine is configured to delete the alert in response to a determination that the alert has been sent to the user device, and wherein the notification engine is configured to send a notification to the respective slave VCI indicating that the alert was sent to the user device.

17. The system of claim 12, wherein the master VCI is configured to process alerts detected at the respective plurality of slave VCIs.

* * * * *